(12) United States Patent
Lehtola et al.

(10) Patent No.: US 7,672,978 B2
(45) Date of Patent: Mar. 2, 2010

(54) HANDLING OF CONTENT IN A DATA PROCESSING DEVICE

(75) Inventors: Ari Lehtola, Pirkkala (FI); Markku Ojala, Tampere (FI); Tiina Partanen, Tampere (FI)

(73) Assignee: Nokia Corporation, Espoo (FI)

( * ) Notice: Subject to any disclaimer, the term of this patent is extended or adjusted under 35 U.S.C. 154(b) by 466 days.

(21) Appl. No.: 10/923,650

(22) Filed: Aug. 20, 2004

(65) Prior Publication Data

US 2006/0041600 A1 Feb. 23, 2006

(51) Int. Cl.
*G06F 12/00* (2006.01)
*G06F 17/30* (2006.01)

(52) U.S. Cl. ............... 707/200; 707/203; 707/204
(58) Field of Classification Search ............ 707/102, 707/1–2, 10, 200–204; 709/207, 217, 246, 709/228; 455/412.2
See application file for complete search history.

(56) References Cited

U.S. PATENT DOCUMENTS

| | | | | |
|---|---|---|---|---|
| 6,034,621 A | * | 3/2000 | Kaufman | 340/7.21 |
| 6,240,426 B1 | * | 5/2001 | Beyda et al. | 707/201 |
| 6,694,336 B1 | * | 2/2004 | Multer et al. | 707/201 |
| 6,721,871 B2 | * | 4/2004 | Piispanen et al. | 712/1 |
| 6,763,226 B1 | * | 7/2004 | McZeal, Jr. | 455/90.2 |
| 7,359,991 B2 | * | 4/2008 | Balducci et al. | 709/248 |
| 2004/0093342 A1 | * | 5/2004 | Arbo et al. | 707/102 |
| 2004/0136404 A1 | * | 7/2004 | Mahonen et al. | 370/503 |
| 2004/0142711 A1 | * | 7/2004 | Mahonen et al. | 455/502 |
| 2004/0205263 A1 | * | 10/2004 | Sivaraman et al. | 710/21 |
| 2005/0038863 A1 | * | 2/2005 | Onyon et al. | 709/207 |
| 2005/0191998 A1 | * | 9/2005 | Onyon et al. | 455/419 |
| 2005/0228812 A1 | * | 10/2005 | Hansmann et al. | 707/102 |
| 2006/0003806 A1 | * | 1/2006 | Weber et al. | 455/561 |
| 2007/0271317 A1 | * | 11/2007 | Carmel | 707/204 |

OTHER PUBLICATIONS

SyncML Sync Protocol, Version 1.1, Feb. 15, 2002, Open Mobile Alliance, pp. 1-62.
SyncML Representation Protocol, Version 1.1, Feb. 15, 2002, Open Mobile Alliance, pp. 1-51.

* cited by examiner

*Primary Examiner*—Don Wong
*Assistant Examiner*—Merilyn P Nguyen

(57) ABSTRACT

A method is shown for handling content in a data processing device, the data processing device comprising at least a first application and a data-handling module. The method comprises: synchronizing, in the control of said data-handling module, content of a first external device and at least one file residing in a specific folder of the data processing device, the file being accessible by at least one first application, and the file being generated by means of the first application or the file being directed to the first application, or both.

11 Claims, 4 Drawing Sheets

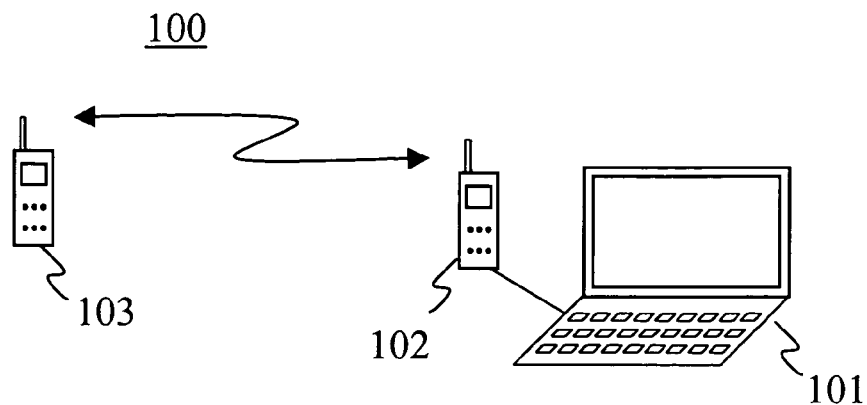
FIG 1
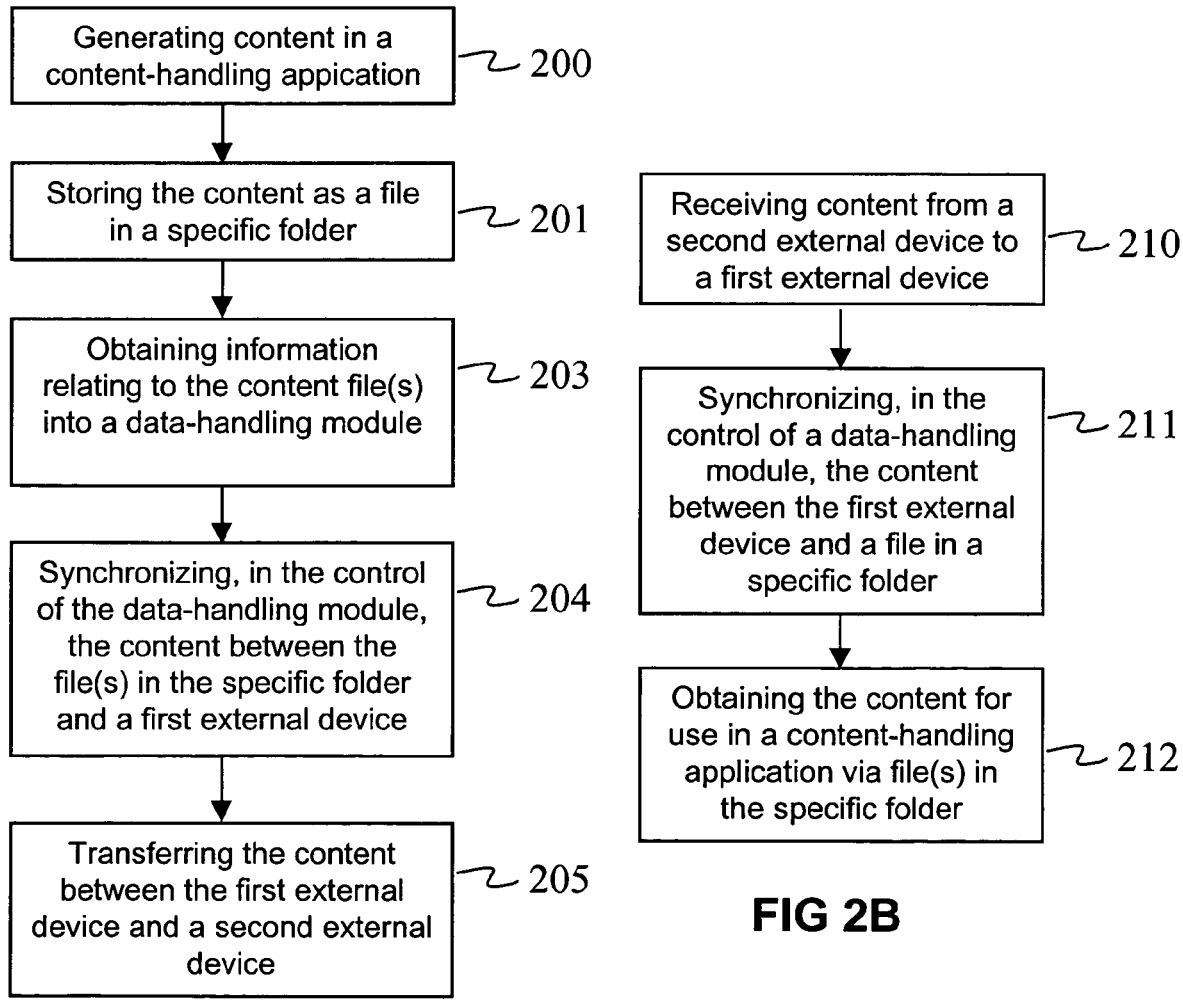
FIG 2A
FIG 2B

HANDLING OF CONTENT IN A DATA PROCESSING DEVICE

FIELD OF THE INVENTION

The invention relates to handling of content in a data processing device and more particularly to end-to-end content-handling chain between applications in a data processing device and an external device.

BACKGROUND OF THE INVENTION

SyncML (Synchronization Markup Language) is a data synchronizing and device management protocol standardized by Open Mobile Alliance (OMA). SyncML can be used for example for transferring data into a terminal and from a terminal.

The term OMA DS (OMA Data Synchronization) is commonly used for referring to data synchronization by means of SyncML. Herein both terms OMA DS and SyncML are used for referring to the same context of data synchronization.

The common XML (eXtensible Markup Language) syntax and semantics used by SyncML protocols are specified in "SyncML Representation Protocol", Version 1.1, 2002-02-15, Open Mobile Alliance. The specification "SyncML Sync Protocol", Version 1.1, 2002-02-15, Open Mobile Alliance, defines synchronization protocol between a SyncML client and server in the form of message sequence charts. It specifies how to use the SyncML Representation protocol so that interoperating SyncML client and server solutions are accomplished.

Communication devices, such as mobile phones and other mobile terminals, are starting to provide access to different kinds of content via OMA DS, which means that SyncML is used as a protocol between the communicating device and connecting party, the connecting party being a suitable data processing device, such as personal computer or some other computing device.

In many cases a suitable computer application is the most feasible way to produce, manipulate and show digital content. Thereby, in order to be able to benefit from OMA DS and wireless data transfer or some other capabilities of external devices there is a need to transfer newly produced content or manipulated content from such a content-handling computer application to an external device and vice versa.

SUMMARY OF THE INVENTION

An object of the invention is to provide for content-handling applications an easy to use interface for employing capabilities of external devices. This is accomplished for example by a data-handling module providing synchronization functionality according to SyncML via a file system interface.

Content-handling applications are often working on top of a computer file system. Thus the file system offers a well-known interface for content-handling application vendors to build their products on. An example of this kind of a content-handling application is for example a multimedia-handling application. By means of a data-handling module providing SyncML synchronization directly from a computer file system for transfer over a wireless link in a wireless network, such as GSM, GPRS, UMTS or some other wireless network, it is possible to provide content-handling applications with functionality for sending OMA DS content without the need to implement SyncML functionality into the content-handling applications. Similarly it is possible to provide content-handling applications with functionality for interacting with any other suitable external devices. Thereby it is possible to retain the well-known file system interface for content-handling applications and yet provide them with a possibility to interact with external devices having SyncML interface.

According to a first aspect of the invention, there is provided a method for handling content in a data processing device, the data processing device comprising at least a first application and a data-handling module, wherein the method comprises:

synchronizing, in the control of said data-handling module, content of a first external device and at least one file residing in a specific folder of said data processing device, said file being accessible by at least one first application, and said file being generated by means of said first application and/or said file being directed to said first application.

The content that is synchronized may be any kind of content; for example MMS messages, SMS messages, emails, contact cards and calendar events may be synchronized.

According to a second aspect of the invention, there is provided a data processing device for handling content comprising at least a first application comprising means for handling content, and a data-handling module, said data-handling module comprising means for synchronizing content of a first external device and at least one file residing in a specific folder of said data processing device, said file being accessible by at least said first application, and said file being generated by means of said first application and/or said file being directed to said first application.

According to a third aspect of the invention, there is provided a system for handling content comprising a first external device, and a data processing device comprising at least a first application, which comprises means for handling content, and a data-handling module, said data-handling module comprising means for synchronizing content of the first external device and at least one file residing in a specific folder of said data processing device, said file being accessible by at least said first application, and said file being generated by means of said first application and/or said file being directed to said first application.

According to a fourth aspect of the invention, there is provided a computer program executable in a data processing device and implementing a data-handling module, the data processing device comprising at least a first application, wherein the computer program comprises:

program code for synchronizing content of a first external device and at least one file residing in a specific folder of said data processing device, said file being accessible by at least one first application, and said file being generated by means of said first application and/or said file being directed to said first application.

According to a further aspect of the invention, there is provided a method for handling content in a data processing device, the data processing device comprising at least a first application and a data-handling module, wherein the method comprises:

obtaining to said data-handling module information about content, which is generated by means of said first application and stored as a file to a specific folder, and synchronizing, in the control of said data-handling module, said file to a first external device.

According to another further aspect of the invention, there is provided a method for handling content in a data processing device, the data processing device comprising at least a first application and a data-handling module, wherein the method comprises:

synchronizing, in the control of said data-handling module, content of a first external device as a file to a specific folder in the data processing device, said file being accessible by at least one first application.

Various embodiments of the invention are shown below. The subject matter described relating to a particular aspect of the invention is also applicable to the other aspects of the invention.

By means of embodiments of the invention it is possible to benefit from technology specified by OMA DS in combination with easy access provided by a file system (for example a standard PC file system). For example, multimedia-handling applications can store multimedia messages as files, while the data-handling module offers an interface for synchronizing multimedia messages from the file system into an external device such as a mobile terminal.

An advantage of some embodiments of the invention is that there is no need to change the behaviour of the content-handling applications in relation to content storing but the content-handling applications can continue the use of the file system. Basically the only implementation requirement with regard to handling MMS messages is to store the message file to the file system (e.g. standard PC file system) and support for an interface that can be used for sending a message from a file.

BRIEF DESCRIPTION OF THE DRAWINGS

Embodiments of the invention will now be described by way of example with reference to the accompanying drawings in which:

FIG. 1 illustrates a system wherein the invention can be used;

FIG. 2A illustrates a flow chart according to an embodiment of the invention;

FIG. 2B illustrates a flow chart according to another embodiment of the invention;

DETAILED DESCRIPTION

Figure 3:
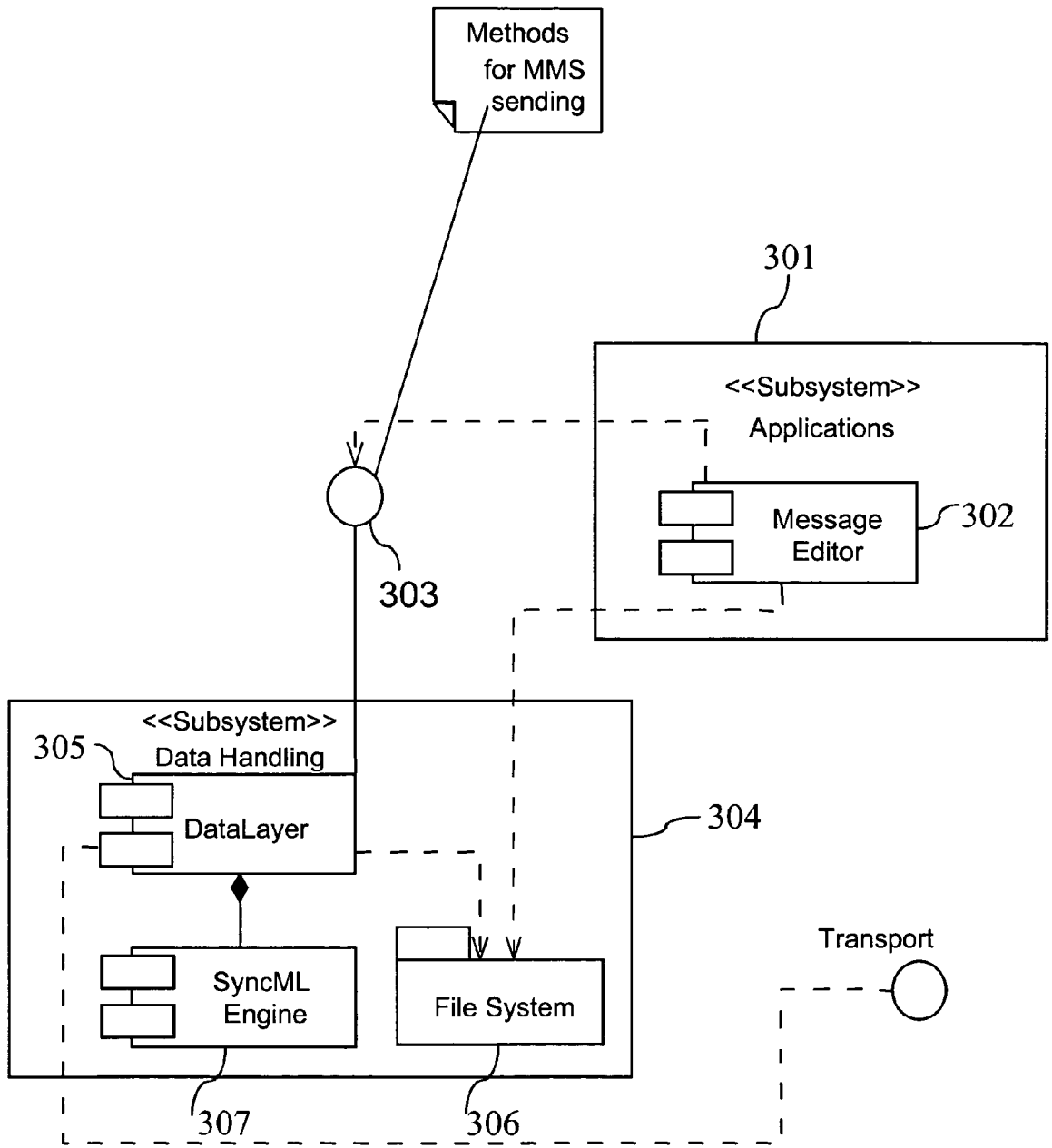
FIG. 3 illustrates software components of an implementation according to an embodiment of the invention.

In the following the invention is described mainly in connection with MMS (Multimedia Messaging Service) messaging. Nevertheless, there are no restrictions to the content-handling applications that may be used in connection with the invention, whereby also other content-handling applications may be used in a corresponding manner. Respectively, in addition to mobile terminals or other wireless communicating device, also other external devices may be used in connection with the invention. The external devices may comprise communication capabilities but this is not a requirement for a device to be used in connection with the invention.

In addition to synchronizing message content, the teachings of the invention may be used for synchronizing any other kind of content as well. For example contact cards may be synchronized by means of the methods of the invention.

FIG. 1 illustrates a system 100 wherein the invention can be used. The system comprises a computer 101 and an external device 102 (herein shown as a mobile terminal) connected to the computer. The external device 102 can also communicate with another external device 103 over a wireless or fixed line link. Also the other external device 103 may be connected to a computer (not shown).

The computer 101 comprises a data-handling module, which may be part of a software application or software assembly. The data-handling module may be included for example in a management application that is used for conducting communication between a computer and an external device. The data-handling module controls synchronization of content between the external device 102 and file(s) in at least one specific folder in the computer. The files in the specific folder are accessible by a content-handling application running in the computer 101. The content-handling application may be for example an MMS messaging application, and the content that is synchronized may be generated by means of the content-handling application and/or the content may be directed to the content-handling application.

FIG. 2A illustrates a flow chart according to an embodiment of the invention, wherein content created by means of a content-handling application is transferred to another communicating party via a first external device. In step 200, content is first generated in the content-handling application, such as an MMS messaging application, running in a computer. Then in step 201, this content is stored as a file in a specific folder residing in the same computer. The specific folder may be any suitable folder wherein files may be stored temporarily.

In step 203, information relating to the content file(s) stored in the specific folder is obtained into a data-handling module also running in the computer. There may be for example an interface through which the content-handling application communicates to the data-handling module that there are content files to be handled in the specific folder. Via such interface the content-handling application may tell the path of the specific folder or the path of a specific message or file in the specific folder. Alternatively, the data-handling module may be set to poll new files in the specific folder periodically. In that case, the data-handling module handles the content file(s) found in the specific folder whenever there is something stored in the specific folder.

In step 204, the data-handling module handles the content file(s) found in the specific folder and controls synchronization of the content file(s) from the specific folder into a first external device. The first external device may be for example a mobile phone, PDA or some other device. As the synchronized file is intended for transmission, the file is synchronized into an "Outbox" folder of the first external device. Then in step 205, the content is transferred from (the Outbox folder of) the first external device to a second external device for example over a wireless link or over a fixed line connection.

Herein it must be noted that if the external device is not available for conducting step 204, the process may stop and wait until the external device is available and proceed thereafter with the synchronization.

FIG. 2B illustrates a flow chart according to an embodiment of the invention, wherein content is received from another communicating party via a first external device and provided for use in a content-handling application running in a computer. The content-handling application may be for example an MMS messaging application.

In step 210, content is received from a second external device to ("Inbox" folder of) a first external device. In step 211, the content is synchronized in the control of a data-handling module running in the computer from (the Inbox folder of) the first external device as a file to a specific folder residing in the data processing device. The specific folder may be for Example "Inbox" or some other predefined folder in the data processing device. The specific folder is such that content-handling applications may browse the files stored in it. Then the content is obtained to the content-handling application via the file in the specific folder in step 212. The content-handling application may be set to poll the specific folder periodically and if necessary the content-handling application may request the data-handling module to synchronize content between the specific folder and the first external device in order to obtain the content for use in the content-handling application.

In an embodiment of the invention, the content, such as multimedia messages, are stored in a computer only in the file system; they are read/modified/deleted via the file system. The (two-way) synchronization between the computer and a mobile terminal can be started by the content-handling applications by using a COM (Component Object Model) interface.

Component Object Model (COM) objects are basically components that can be used by applications to perform one or more tasks. They are most commonly implemented as a dynamic-link library (DLL). Like a conventional DLL, a COM object provides methods that a computer application can call to perform any of the tasks supported by the COM object. When a COM object is created, the creation method returns an interface pointer (that is, a pointer to a COM interface). A computer application can then use that pointer to access any one of the interface's methods (for example a method for sending a multimedia message).

For example, the sending of an MMS message from a computer via a mobile terminal to a wireless network may be implemented via a COM interface provided by a data-handling module of the invention. In this example, the Content-handling application stores an MMS message as a file into a specific, predefined folder (or into some other temporary location) in a file system. After that the content-handling application requests the data-handling module (by using data-handling module's COM interface) to send the message. The content-handling application gives the message file path as a parameter (that is, path to the location where temporary file was saved) to the data-handling module. The sending starts a special synchronization sequence: only from the specific folder; one-way synchronization from the computer to the mobile terminal; with META-data "send". After the MMS has been successfully stored in the "Outbox" folder of the mobile terminal (synchronization has ended successfully between the computer and mobile terminal) the data-handling module may store the MMS in the corresponding Outbox folder in the computer, if there is such Outbox folder available. (This may be the case, if the data-handling module is part of a management application that is used for conducting communication between the computer and the mobile terminal.) Then the Outbox view in the computer will show the message normally. There is no need for signalling between the mobile terminal and the computer when the mobile terminal actually sends the MMS message. In order to see the current actual status of his/her messaging folders the user of the computer may refresh the messaging view, whereby a two-way synchronization is done between the mobile terminal and the computer.

FIG. 3 illustrates software components of an implementation according to an embodiment of the invention. The implementation comprises an Application sub-system 301 and a Data Handling subsystem 304. The Application subsystem comprises a Message Editor module 302, which is used for creating MMS message content. This Message Editor is an example of a content-handling application of the invention. The Data Handling subsystem comprises a DataLayer module 305, a File System 306 and a SyncML Engine module 307. The Data Layer module 305 provides the functionality of the data-handling module of the invention.

The Message Editor module 302 may read and write files in the File System 306 and interact with the Data Layer module 305 via the methods provided by an interface 303. Also the Data Layer module 305 may read and write files in the File System 306. Further, the Data Layer module 305 employs functionalities of the SyncML Engine module 307 in conducting synchronization between files in the File System 306 and external devices.

Figure 4:
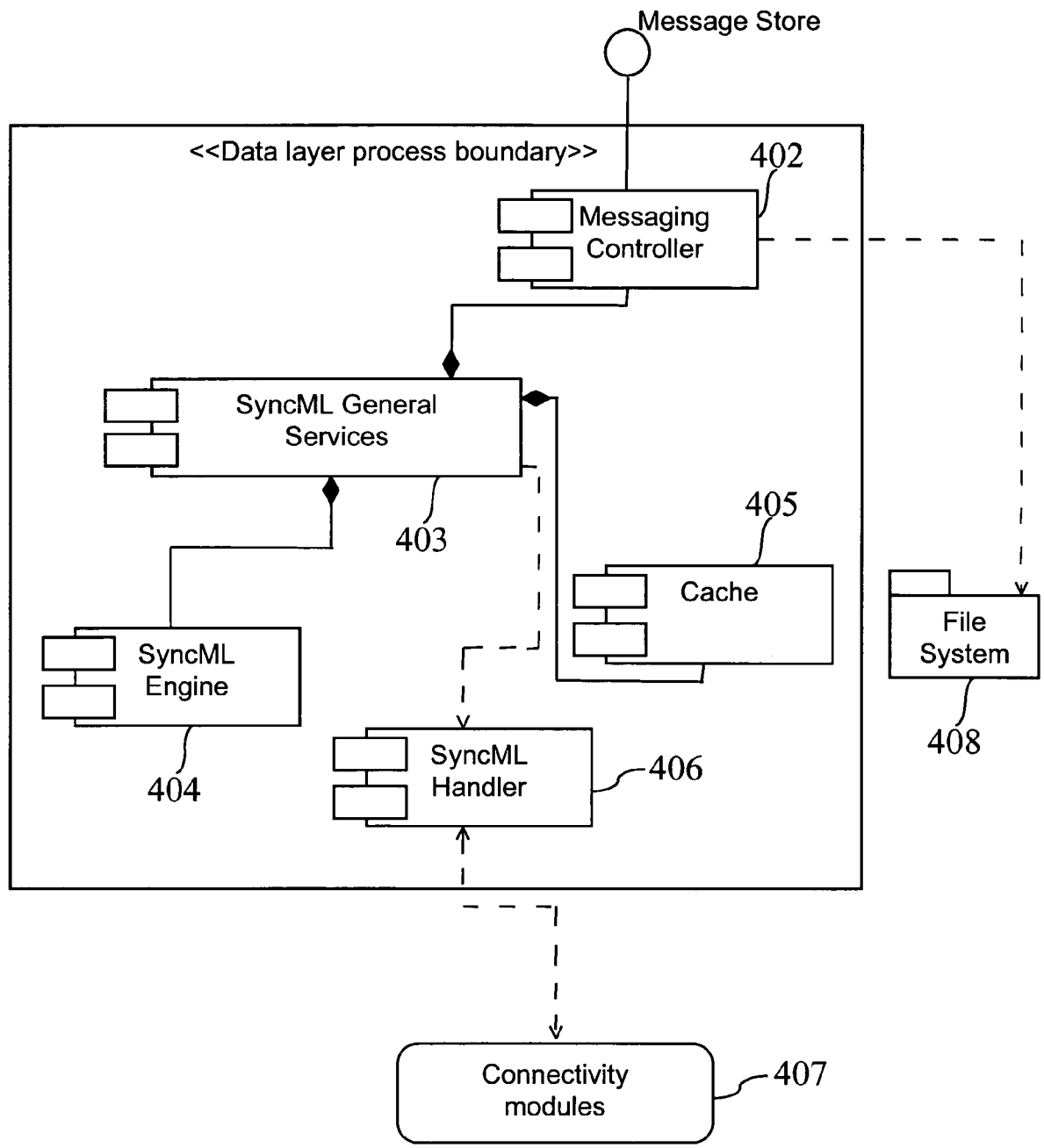
FIG. 4 illustrates structure of modules of a data-handling module according to an embodiment of the invention.

FIG. 4 illustrates structure of modules of a data-handling module according to an embodiment of the invention. The data-handling module comprises a Messaging Controller module 402, a SyncML General services module 403, a SyncML Engine module 404, a SyncML Handler module 406, and a Cache module 405. The FIG. 4 shows also a File System module 408 and Connectivity modules 407.

The role of different modules is briefly discussed below:
1) The SyncML Engine module 404 provides an interface for OMA DS content controllers (for example for the Messaging Controller 402) for adding OMA DS commands and for starting the synchronization sequence for one specific content type database. The SyncML Engine module 404 obtains connection to a mobile terminal (or some other external device) when ordered to synchronize, executes synchronization, and finally releases the connection to the mobile terminal. The SyncML Engine module 404 also uses the SyncML Handler module 406 to assemble and disassemble the OMA DS packages and to send and receive packages between the mobile terminal and the computer, in which the data-handling module is running.
  The SyncML Engine module 404 implements queue for the synchronization operations so that two synchronization operations cannot be run into the same external device at the same time. The SyncML Engine module is responsible for controlling the synchronization session (starting and stopping the synchronization session, making synchronization analysis and conflict detection/resolution) between the computer and the mobile terminal.
2) The SyncML Handler module 406 implements OMA DS package assembling and disassembling engine. SMLRTK (SyncML Resource Toolkit) is used to assemble and disassemble the OMA DS messages. It uses connectivity modules, which provide connectivity between the computer and the mobile terminal) to send packages to the mobile terminal and to receive packages from the mobile terminal.
3) The SyncML General Services module 403 is a module that is used by content controllers, such as the Message Controller 402. It features components such as ID mapping of the data items in the mobile terminal and database dependent anchor base. The SyncML General services functionality can be extended by adding new content controllers. Content controllers are content specific and they can be implemented as separate DLL (Dynamic Link Library) components. Each content controller provides data handling capabilities to store and manage content data. They also provide applications with access to data.

4) Messaging controller module 402 is responsible for MMS synchronization between the mobile terminal and the computer. It uses the interface of the SyncML Engine module to synchronize message content between the computer and the mobile terminal. It features also its own interface that is used for sending MMS messages from the mobile terminal.

It must be noted that FIGS. 3 and 4 show only example implementations and that also other or alternative modules in addition to or instead of those shown in FIGS. 3 and 4 may be included in an implementation of the invention.

Figure 5:
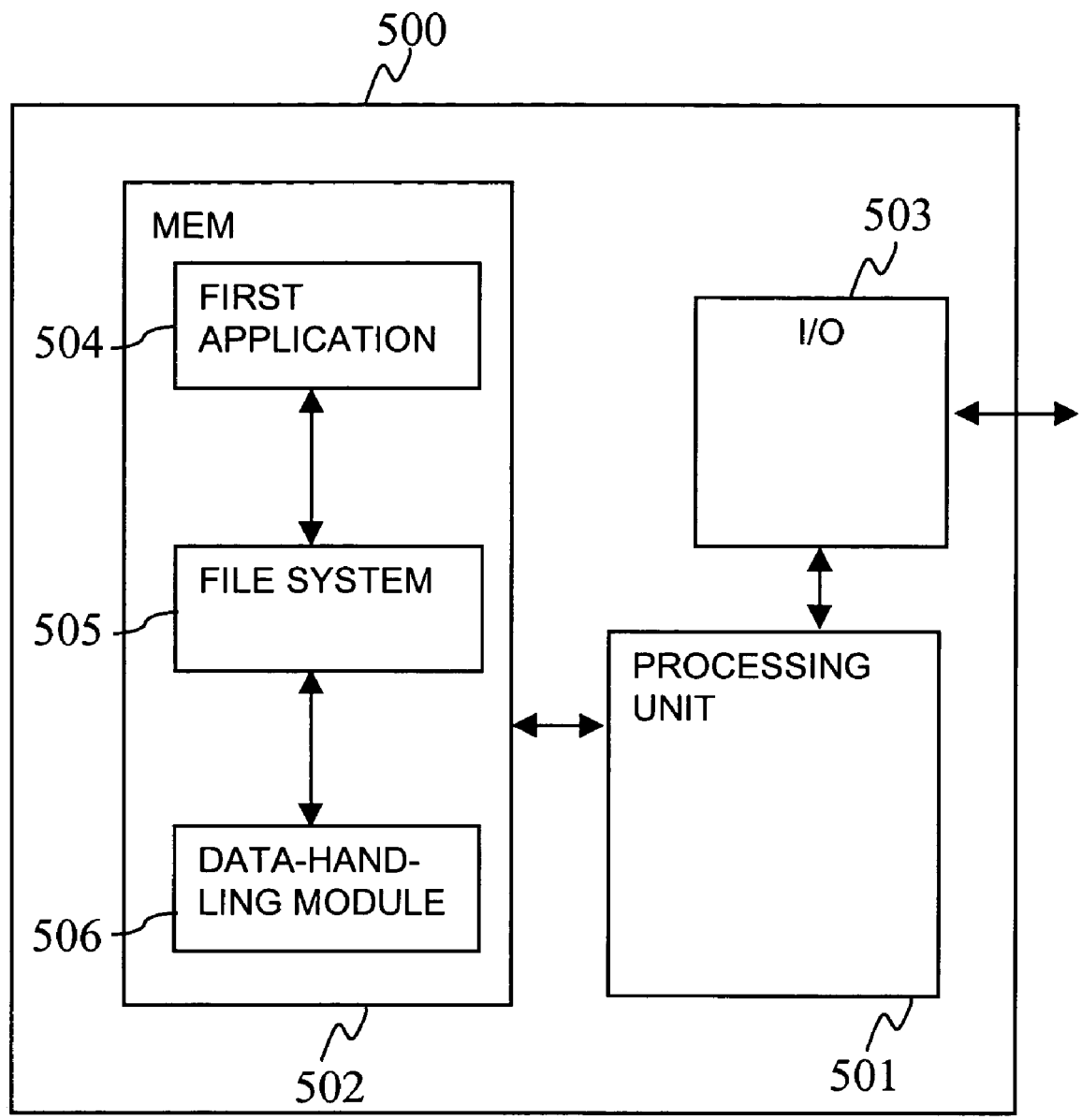
FIG. 5 illustrates a block diagram of a data processing device according to an embodiment of the invention.

FIG. 5 illustrates a block diagram of a data processing device 500 according to an embodiment of the invention. Such a data processing device may be for example a general-purpose computer, a laptop or some other data processing device capable of executing computer programs.

The data processing device 500 comprises processing unit 501 and an input/output module 503 coupled to the processing unit 501. The processing unit 501 is coupled to a memory 502 as well. The memory comprises computer software executable in the processing unit 501, namely a first application 504 and a data-handling module 506, and in addition a file system 505 for storing files.

The processing unit controls, in accordance with the data-handling module, the data processing device to synchronize content between a wireless communication device and file(s) residing in a specific folder in the file system 505, the content file(s) in the specific folder being available for use in the first application and/or generated by means of the first application.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method, comprising:
   obtaining information relating to a content, said information being used for synchronizing said content between a data processing device and a first external device,
   transferring said content from said data processing device to said first external device by way of synchronization between said data processing device and said first external device, said content being stored in said first external device for further transmission to a second external device that does not have direct communications with said data processing device, and
   controlling a transmission of said content from said first external device to said second external device,
   wherein said content is generated by a content-handling application of said data processing device and stored as at least one file in a specific folder of said data processing device,
   wherein said synchronizing between said data processing device and said first external device is controlled by a data-handling module of said data processing device without implementing synchronization functionality into the content-handling application,
   and wherein said data-handling module provides an interface for use by said content-handling application, and the transmission of said content from said first external device to said second external device is commanded by said content-handling application via said interface.

2. The method of claim 1, wherein said data-handling module is part of a second application.

3. The method of claim 2, wherein said second application is a management application that is used at least for conducting communication between the data processing device and external devices.

4. The method of claim 1, wherein obtaining information relating to said content comprises:
   obtaining information relating to said content by periodically polling said specific folder.

5. The method of claim 1, wherein said synchronizing is implemented by means of a Synchronization Markup Language.

6. The method of claim 1, wherein said content is one of the following: an multimedia messaging service message, a short message service message, an email, a contact card and a calendar event.

7. The method for claim 1, further comprising:
   controlling said first external device to receive another content from said second external device and to store said other content in said first external device for further transmission to said data processing device,
   receiving said other content from said first external device by way of synchronization between said data processing device and said first external device, and
   storing said other content as at least one file in said specific folder of said data processing device,
   wherein said other content is generated for said content-handling application of said data processing device.

8. An apparatus, comprising:
   a communication device, configured to communicate with a first external device;
   a processing unit, configured to process a content-handling application and a data-handling module; and
   a memory device, comprising storage space for a file system, wherein a content generated by said content-handling application is stored as at least one file in a specific folder of said file system,
   wherein said data-handling module comprises a synchronization engine and an interface for use by said content-handling application, said synchronization engine is configured to:
   obtain information relating to the content, said information being used for synchronizing said content between said apparatus and a first external device, and transfer said content from said apparatus to said first external device by way of synchronization between said apparatus and said first external device, said content being stored in said first external device for further transmission to a second external device that does not have direct communications with said data processing device,
   wherein said synchronizing between said data processing device and said first external device is controlled by said data-handling module without implementing synchronization functionality into said content-handling application,
   and wherein the further transmission of said content from said first external device to said second external device is commanded by said content-handling application via said interface of said data-handling module.

9. The apparatus of claim 8, wherein said synchronization engine is further configured to:
   control said first external device to receive another content from said second external device and to store said other content in said first external device for further transmission to said data processing device, and receive said other content from said first external device by way of synchronization between said data processing device and said first external device, wherein said other content is generated for said content-handling application of said data processing device, and wherein said memory device is configured to store said other content as at least one file in said specific folder of said file system.

10. A computer readable storage medium having a computer program stored thereon for execution by a data-handling module in a data processing device, wherein the computer program comprises:

program code for obtaining information relating to a content, said information being used for synchronizing said content between said data processing device and a first external device, and program code for transferring said content from said data processing device to said first external device by way of synchronization between said data processing device and said first external device, said content being stored in said first external device for further transmission to a second external device that does not have direct communications with said data processing device, program code for controlling a transmission of said content from said first external device to said second external device, wherein said content is generated by a content-handling application of said data processing device and stored as at least one file in a specific folder of said data processing device, and wherein said synchronizing between said data processing device and said first external device is controlled by said data-handling module of said data processing device without implementing synchronization functionality into the content-handling application, wherein said data-handling module provides an interface for use by said content-handling application, and the transmission of said content from said first external device to said second external device is commanded by said content-handling application via said interface.

11. The computer readable storage medium of claim 10, wherein the computer program further comprises:

program code for controlling said first external device to receive another content from said second external device and to store said content in said first external device for further transmission to said data processing device, program code for receiving said other content from said first external device by way of synchronization between said data processing device and said first external device, and program code for storing said other content as at least one file in a specific folder of said data processing device, wherein said content is generated for said content-handling application of said data processing device.

* * * * *